Oct. 23, 1956     M. B. TAYLOR     2,767,939
FLYING AUTOMOTIVE VEHICLE ASSEMBLY
Filed Dec. 26, 1952     5 Sheets-Sheet 1
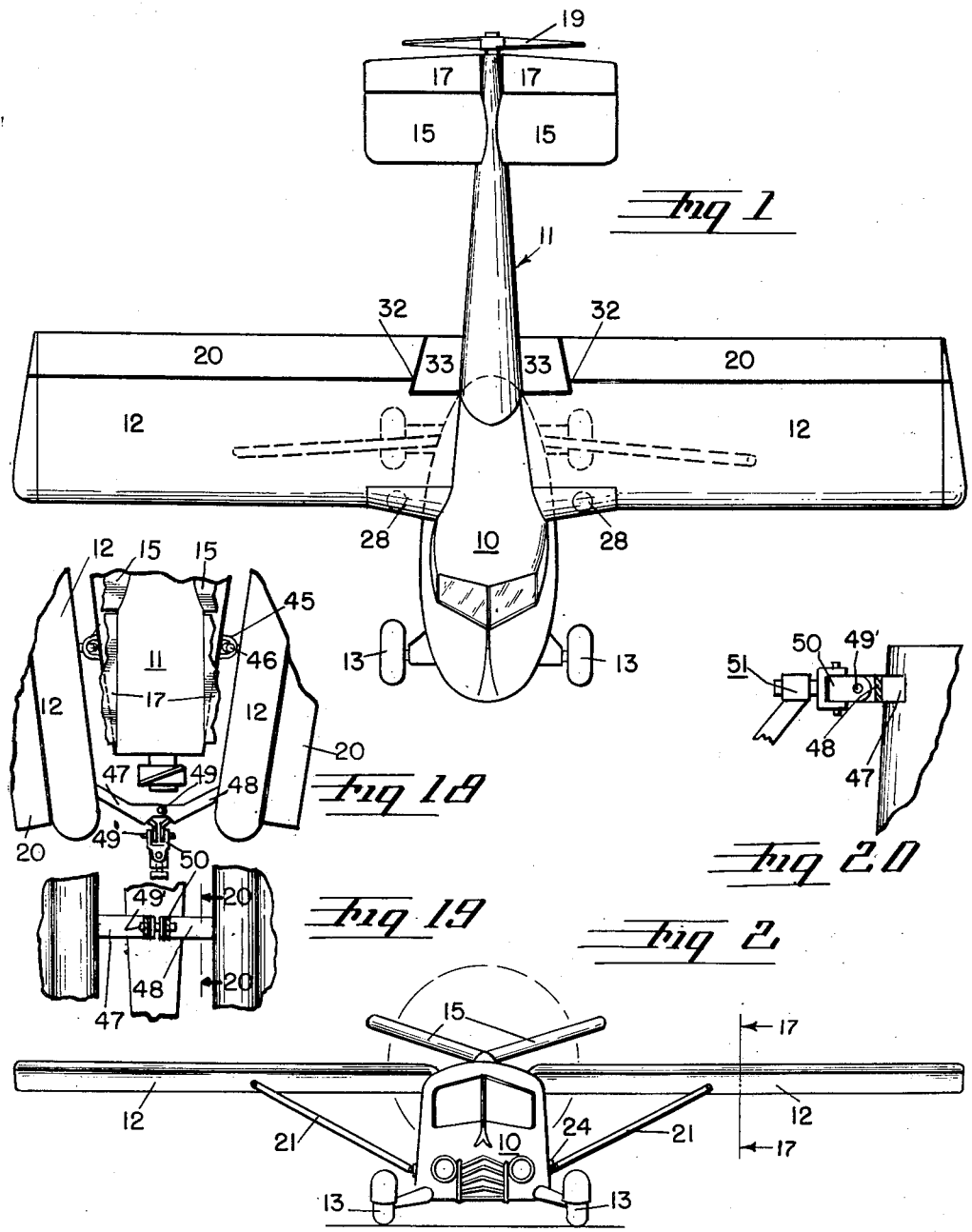
INVENTOR.
MOULTON B. TAYLOR
BY
ATTORNEY

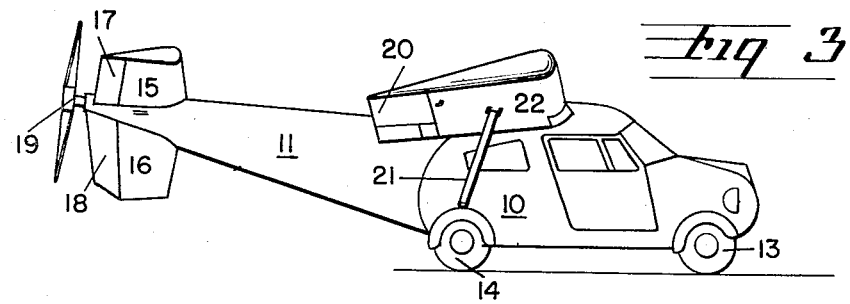
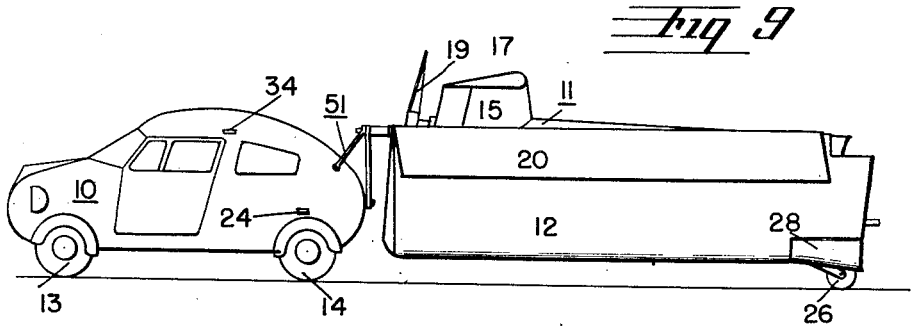
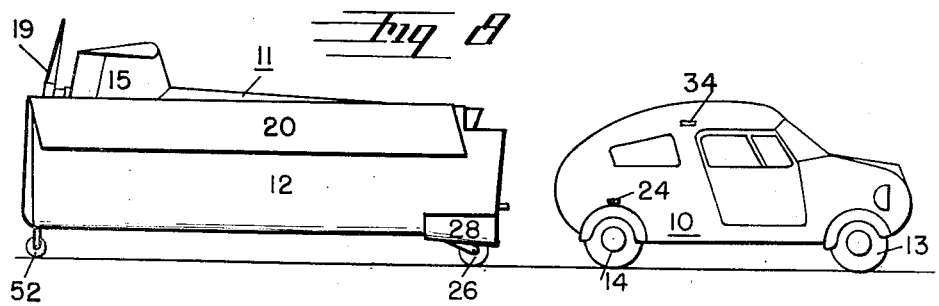

Oct. 23, 1956 M. B. TAYLOR 2,767,939
FLYING AUTOMOTIVE VEHICLE ASSEMBLY
Filed Dec. 26, 1952 5 Sheets-Sheet 3
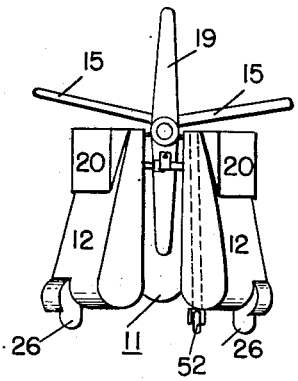
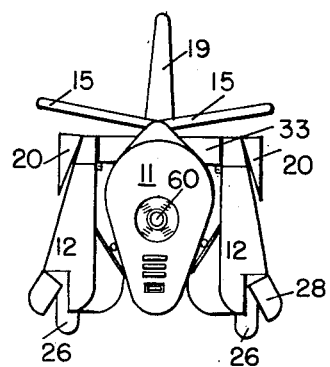
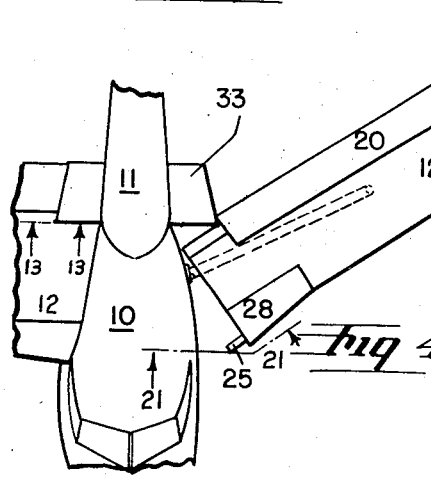
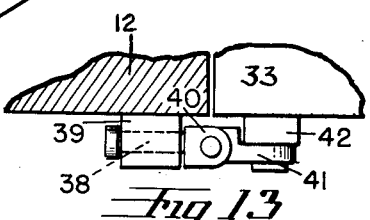
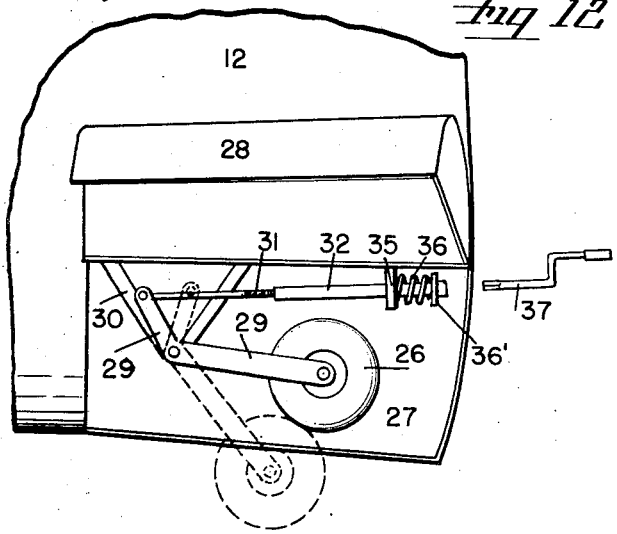
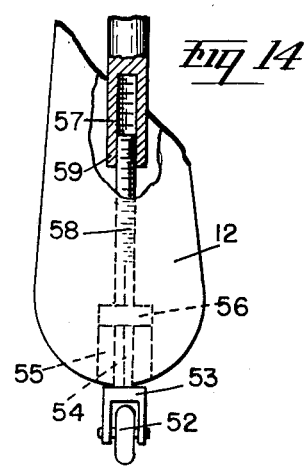
INVENTOR.
MOULTON B. TAYLOR
BY
F. R. Geisler
ATTORNEY Oct. 23, 1956  M. B. TAYLOR  2,767,939
FLYING AUTOMOTIVE VEHICLE ASSEMBLY
Filed Dec. 26, 1952  5 Sheets-Sheet 4
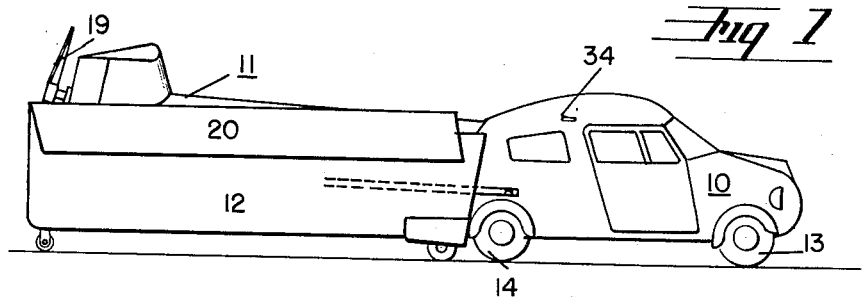
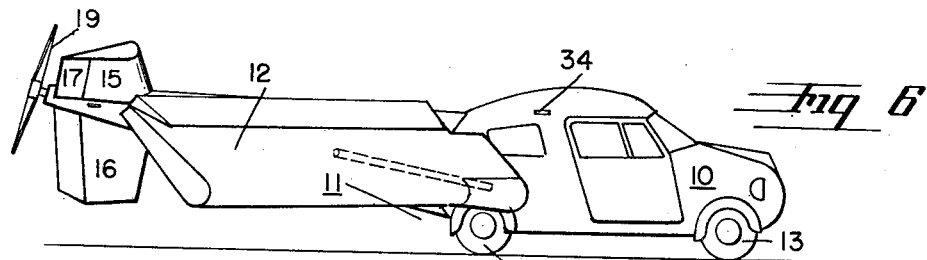
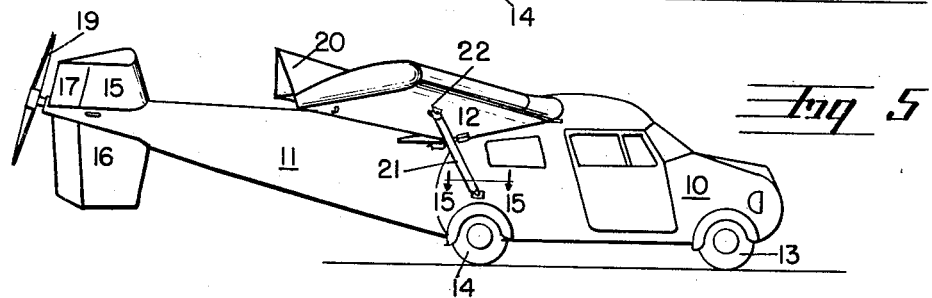
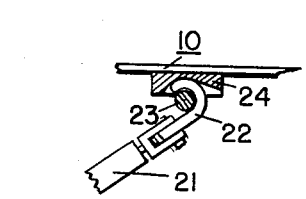
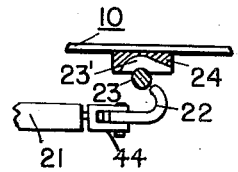
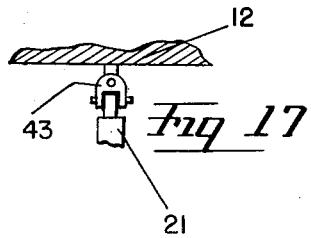
INVENTOR.
MOULTON B. TAYLOR
BY
F. R. Geisler
ATTORNEY.

Oct. 23, 1956  M. B. TAYLOR  2,767,939
FLYING AUTOMOTIVE VEHICLE ASSEMBLY
Filed Dec. 26, 1952  5 Sheets-Sheet 5

*INVENTOR.*
MOULTON B TAYLOR
BY
ATTORNEY

United States Patent Office 2,767,939
Patented Oct. 23, 1956

2,767,939
FLYING AUTOMOTIVE VEHICLE ASSEMBLY

Moulton B. Taylor, Longview, Wash., assignor to Aerocar, Inc., Longview, Wash., a corporation of Washington Application December 26, 1952, Serial No. 328,043
9 Claims. (Cl. 244—2)

This invention relates in general to an automotive vehicle assembly equally suitable either for air travel or for land travel and capable of being converted quickly and easily from a highway automobile to an aeroplane and vice versa.

More specifically this invention relates to a convertible assembly, one arrangement of which results in a complete aeroplane and the other arrangement of which results in a highway automobile having a detachable trailer, which assembly is completely mobile without recourse to other transport means.

While various attempts have heretofore been made to produce vehicles adapted for both land and air travel, the necessity of removing or folding at least the wings from an aeroplane, or similar vehicle adapted for air travel, before the same can be operated on a highway as a land vehicle, has heretofore presented two main difficulties.

One of these difficulties is the problem of folding or removing or demounting the external members necessary for air travel, in particular the wings, when the vehicle is to be used for land travel, and remounting such members again for air travel. Thus when the folding, demounting or remounting of the wings involves considerable effort, labor, time or encumbrance, the convertible feature of the vehicle is largely negatived.

In the situation of demounting the wings, the other difficulty is the problem of temporarily disposing of the wings, transporting them and handling the demounted members while the vehicle is used for land travel. If such removed members are stored at the landing field then it is necessary, after the vehicle has been used for land travel, to return to the same landing field for the remounting of such members for air travel. This defeats a main objective which would be to enable the vehicle to proceed by land when conditions are temporarily unsuited for air travel and then subsequently again to continue on the course by air.

One of the objects of the present invention is to provide an improved convertible flying automotive assembly in which the wings and other members, which are required only for air travel, can be easily and quickly demounted and again remounted by a single operator with very little physical effort and only a minimum expenditure of time.

Another principal object of the invention is to provide an improved convertible assembly of the character described wherein the demountable members, not used in land travel, will combine of themselves to form a separate trailer vehicle complete in itself, so as to be capable of being towed along the highway by the land automobile portion of the assembly, instead of necessitating the leaving of such members at the spot where their demounting takes place, or instead of requiring the temporary employment of another vehicle or other additional equipment to provide mobility for conveying the demounted members, or even requiring the demounted members to be awkwardly carried by such land automobile portion of the assembly.

A related object of the invention is to provide such an assembly in which the demounted members will constitute a trailer vehicle which can be easily unhitched entirely from the land automobile portion of the assembly and thus, at the option of the operator or driver, either be towed along the highway or temporarily parked at any convenient spot along the highway, stored in a conventional auto garage instead of hangar, in the same manner as any ordinary automobile trailer, and at the same time meeting existing vehicle codes and highway regulations.

A further object of this present invention is to provide such an assembly in which that portion of the assembly which remains after the demountable members required for air travel are removed will constitute not merely a vehicle capable of some degree of travel on land, but actually a land automobile capable of, and suitable for, extensive highway travel and embodying all features required to meet existing codes and regulations for highway vehicles.

An additional object is to provide a so-called flying automobile which will be complete, self contained, practical, of suitable design and construction for air or highway travel, and inexpensive enough to appeal to a potentially large market.

The manner in which and the means by which these objects and other advantages are attained through my invention will be briefly described with reference to the accompanying drawings.

In the drawings, which are more or less diagrammatic:

Fig. 1 is a top plan view of the vehicle assembly as arranged for air travel and thus in the form simulating an aeroplane;

Fig. 2 is a corresponding front elevation;

Fig. 3 is a corresponding side elevation;

Fig. 4 (Sheet 4) is a fragmentary top plan view illustrating one of the wings in the process of being folded so as to be demounted from the automobile portion of the assembly;

Fig. 5 (Sheet 2) is a side elevation also showing the wings in the process of being demounted;

Figs. 6 and 7 (Sheet 2) are side elevations illustrating the successive stages in the demounting of the wings;

Fig. 8 (Sheet 3) is a side elevation illustrating the entire separation of the automobile portion of the assembly from the wings and tail portion of the assembly and showing the wings and tail portion forming an entirely separate trailer vehicle;

Fig. 9 (Sheet 3) is a side elevation of the same trailer vehicle and automobile portion, illustrating the trailer vehicle attached to the automobile for the purpose of being towed by the latter;

Fig. 10 (Sheet 4) is an end view of the trailer vehicle taken from the left of Fig. 8;

Fig. 11 (Sheet 4) is an opposite end view of the trailer vehicle taken from the right of Fig. 9;

Fig. 12 (Sheet 4) is a fragmentary side elevation, on an enlarged scale, of an end of a demounted wing with the cover of a wheel housing chamber raised to show the wing-wheel, a lowered position of such wing-wheel being indicated by broken line;

Fig. 13 (Sheet 4) is an enlarged fragmentary section taken on line 13—13 of Fig. 4 showing the universal-pivotal joint by which each wing is secured to its mounting block on the tail portion of the entire assembly;

Fig. 14 (Sheet 4) is a fragmentary end view, on an enlarged scale, of the outer end of one of the wings showing an additional wheel for temporarily supporting the end of the wing and therewith the corresponding ends of the tail section end and the other wing when the wings are demounted from the automobile portion, and indicating in broken lines the adjustable screw jack mounting for the wheel;

Fig. 15 (Sheet 2) is an enlarged fragmentary plan section taken on line 15—15 of Fig. 5 looking downwardly on the strut when the wing is in the process of being swung back before the strut is detached from the automobile portion showing the detachable, pivotal and swivel mounting at the bottom end of one of the wing struts;

Fig. 16 (Sheet 2) illustrates the same strut detached from its mounting on the automobile when the wing has been swung further back;

Fig. 17 (Sheet 2) is an enlarged fragmentary sectional elevation showing the upper end of one of the wing struts and its connection with the wing, the section being taken on line 17—17 of Figure 2;

Fig. 18 (Sheet 1) is a fragmentary plan view, on an enlarged scale, showing the end of the tail portion and the corresponding ends of the two wings when the wings are in folded position and placed adjacent the opposite sides of the tail portion, and illustrating the means by which the ends of the wings are attached together in such position;

Fig. 19 (Sheet 1) is a fragmentary end elevation of the means connecting the wing ends shown in Fig. 18;

Fig. 20 (Sheet 1) is a fragmentary sectional elevation taken in part on line 20—20 of Fig. 19 showing the same wing-end connecting means and also showing a portion of the trailer coupling attached to the connecting means whereby the separate trailer is connected to the automobile for towing;

Figure 21:
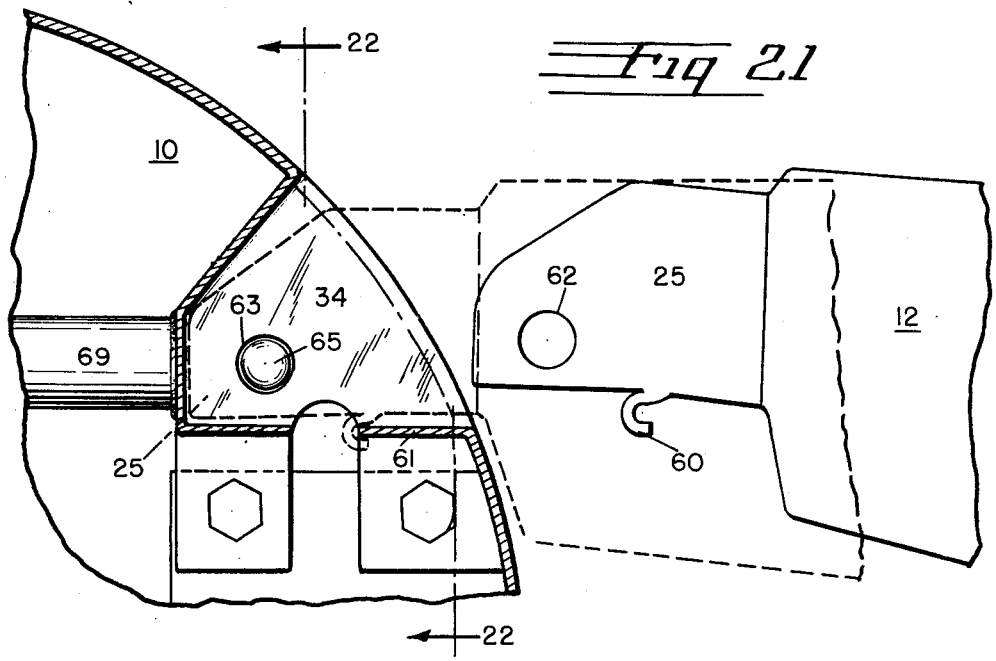
Figure 22:
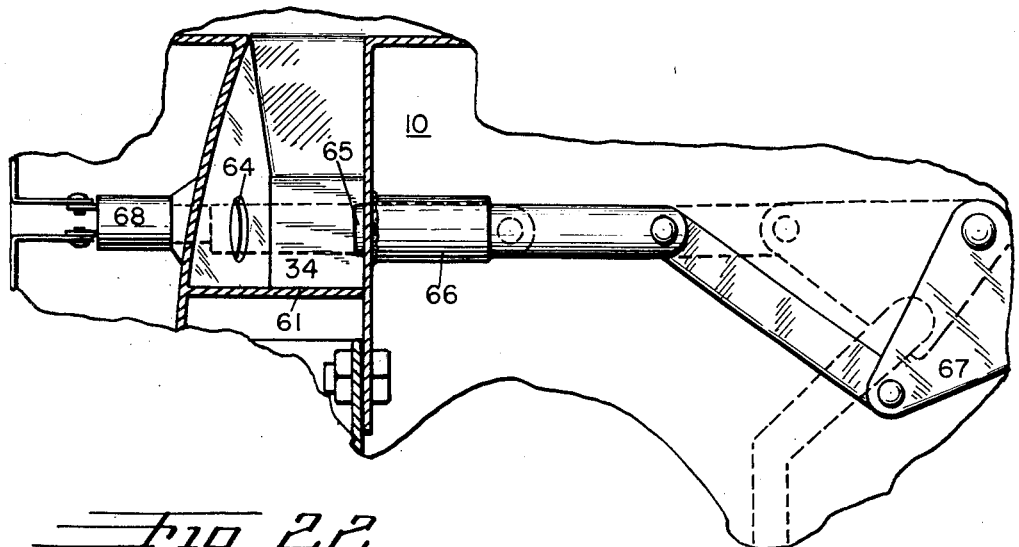

Fig. 21 (Sheet 5) is an enlarged elevation of the latch element on the front edge of one of the wings and a fragmentary sectional elevation of the adjacent portion of the automobile showing the aperture into which the latch element is received, this composite figure being taken on the line indicated at 21—21 in Fig. 4; and Fig. 22 (Sheet 5) is a fragmentary sectional elevation of the same portion of the automobile taken on line 22—22 of Fig. 21.

In the drawings the reference character 10 indicates in general the automobile portion of the assembly, 11 indicates the tail portion and 12, 12 indicate the wings.

The automobile 10 has a pair of front steering wheels 13, 13 which are driven by the motor (not shown) located in the automobile in a more or less conventional manner. However, the motor in the automobile is located near the rear of the automobile instead of in the front. The automobile also has a pair of rear wheels 14, 14 which are not driven and thus are free to rotate except for the customary brake controls. The horizontal stabilizers 15, 15 are mounted on the tail portion 11 together with the vertical stabilizer 16 and rudder 18. The horizontal stabilizers 15, 15 preferably extend slightly obliquely upwardly, as shown in Fig. 2, instead of extending in the same horizontal plane, to facilitate wing folding and improve aerodynamic characteristics. The usual elevators 17 (Fig. 1) are hinged to the stabilizers 15 and the usual rudder 18 (Fig. 3) is hinged to the vertical stabilizer 16. The usual ailerons 20 (Fig. 1) are hinged to the wings 12.

The aeroplane propeller 19 is mounted on the end of the tail portion 11, and, as will be noted from Fig. 3, the axis of rotation of the propeller 19 is oblique to the horizontal plane of the four wheels of the automobile, the reason for which will be apparent later. Similarly the tail portion 11 is inclined slightly upwardly with respect to the horizontal plane of the wheels, the longitudinal bottom line of the tail portion sloping upwardly to a greater degree than the longitudinal top line, as apparent from Fig. 3, inasmuch as the tail portion 11 decreases constantly in cross sectional size from the front to the rear, as is generally customary.

When the tail section of the assembly is connected to the automobile (as illustrated in Figs. 1–7), the propeller shaft (the end of which is indicated at 60 in Fig. 11) is joined to the automobile drive shaft through the medium of a splined sleeve connection (not shown), the rear end of the drive shaft being exposed at the rear of the automobile portion when a cover door (not shown) on the rear of the automobile is opened preparatory to the securing of the tail section to the automobile. The various controls for the ailerons, elevators and rudder are not illustrated. However it will suffice for the present application to explain merely that the controls, as well as the motor control and clutch control, are located in the automobile in close proximity to the driver's seat. The tail portion is secured to the rear of the automobile by a suitable three-point locking connection. These various connecting and control means are not illustrated in the drawings since they do not form any part of the invention claimed in this present application.

The center of gravity of the entire assembly, when the assembly is arranged for air travel, is slightly forward of the rear wheels 14. This is an important feature in the invention and this feature combines with the upwardly sloping tail portion and inclined propeller and thrust axis to enable the free rear wheels of the automobile to serve as landing wheels for the aeroplane with only a light weight at any time imposed on the front wheels when the assembly is arranged for air travel. This facilitates control and balance of the machine as an aircraft to permit takeoff and landings. On the other hand, when the tail portion and wings are disconnected from the automobile, the center of gravity for the automobile is shifted forward sufficiently to provide the desired weight on the front wheels for suitable road traction and for proper steering.

The tail portion 11 includes a pair of wing mount supports 33 (Fig. 1) at the forward end of the tail section and on opposite sides respectively. Each of the wings 12 is permanently connected to one of these wing mount supports by a flexible joint assembly comprising a universal-pivotal joint as shown in detail in Fig. 13.

A strut 21 (Fig. 2) extends from the under side of each wing downwardly and inwardly to the respective side of the automobile. The upper end of each strut is permanently connected to its wing by a pivotal connection shown in detail in Fig. 17. The lower end of each strut 21 carries a swively and pivotally-mounted hook 22 (Fig. 16) adapted for engagement with a loop 23 and recess slot 23' in a strut mounting support 24 secured on the automobile. Each wing 12 also has a latch element 25 (Fig. 4) secured to the inner end of the front or leading edge spar of the wing, which latch element is adapted to extend into an aperture 34 in the side of the automobile and to be engaged inside the automobile by a locking pin when the wing is in position for flying. Referring to Fig. 21, the latch element 25 of the wing 12 (being the wing on the right as viewed in Fig. 4) is shown in the act of being inserted into the corresponding aperture 34 in the side of the automobile 10. A hook 60 on the latch element is adapted to engage a lip 61 provided in the aperture 34 for temporarily holding the latch element 25 in place in the automobile during the locking of the latch element. The latch element 25 has an opening 62, which, when the latch element is in place in the automobile, registers with a pair of locking pin holes 63 and 64 (Fig. 22) in the side walls of the aperture 34 respectively. A locking pin 65, slidably supported in a stationary sleeve 66 (Fig. 22), is connected by suitable linkage with a manually operated lever, a portion of which is shown at 67 in Fig. 22, which is operated from inside the automobile, so that when the lever 67 is pulled forwardly to the broken line position indicated in Fig. 22, the locking pin 65 will be moved into the opening 62 in the latch element 25 and extend a slight distance into the hole 64 in the opposite wall of the aperture 34. A stationary rest (not shown) on the inside of the automobile holds the lever 67 against inadvertent movement when the locking pin 65 has been set in locking position. A switch 68 in the starter circuit of the automobile engine is so arranged as to be closed by the locking pin 65 when the pin is in locking position. The switch 68 and the corresponding switch (not shown) on the opposite side of the automobile are so arranged that the automobile engine cannot be started if either of the locking pins for the two wings should not be in locking position. Thus when each wing 12 is mounted for flying it is secured at its leading edge to the automobile portion of the assembly and secured to its mount support on the tail portion of the assembly and is also supported on its strut which extends from the automobile portion up against the under side of the wing.

The flexible joint assembly (Fig. 13) by which each wing 12 is secured to its mount support 33 on the tail portion, comprises a stub shaft 38 rotatably held in a bearing 39 secured under the wing 12. One end of the shaft 38 is formed into a ring 40 in which a bearing block 41 is pivotally mounted. A boss 42, secured to the wing support 33 is pivotally held on the block 41. The three axes of rotation of the members of the joint assembly are thus perpendicular to each other.

The connection (Fig. 17) by which the upper end of each strut 21 is connected to the under side of its respective wing, includes a double yoke member 43, pivotally secured to the wing, in which the strut 21 is pivotally held.

The lower end of each strut 21 (Figs. 15 and 16) carries a swivelly-mounted member 44 to which is pivotally connected the hook 22 which is adapted to fit into the recess slot 23' in the mounting support or block 24 under a locking loop 23. The block 24 is rigidly secured to the automobile. The recess 23', locking loop 23 and hook 22 are so formed and arranged that when the strut 21 extends upwardly and outwardly from the automobile the strut will be locked to the block 24 and thus to the automobile, but when the upper end of the strut is swung downwardly and rearwardly (to the position illustrated in Fig. 16) the hook 22 will free itself from the recess 23' and the locking loop 23 on the block 24.

When the wings are to be demounted from the automobile portion of the assembly the locking pins are unlocked from the latch members 25 attached to the front spars of the wings. This permits the wings, while still resting on their struts 21, to be swung rearwardly on the flexible joint assemblies through which they are attached to their mount blocks 33. The joints at the top and bottom ends of the struts 21 enable the struts to swing rearwardly and downwardly while still carrying the wing weight. As a result, as each unlocked wing is pushed rearwardly it swings down and aft from the position of Fig. 1 through the position of Fig. 4 or Fig. 5, and through the subsequent position illustrated in Fig. 6, until the wing comes into substantial vertical position adjacent the tail portion.

When the wings 12 are brought into this latter position the outer, rear, or free ends of the wings are attached to each other and to the rear of the tail portion 11. Referring now to Fig. 18, a pair of eye-loops 45 are mounted on opposite sides of the tail portion 11 and are adapted for engagement by hooks 46 carried on the wings. The two wings also carry the two coupling members 47 and 48 respectively (Figs. 18 and 19), one of which, namely the member 48, terminates in a stub adapted to support the other member 47, the members 47 and 48 also terminating in eye-loops, thus enabling the two members 47 and 48 to be coupled by the insertion of a suitable pin 49. This pin 49 can in turn be held against inadvertent displacement by an ordinary safety pin type cotter pin (not shown). The extended ends of the members 47 and 48 are also arranged to have a yoke 50 attached to them by means of a horizontal pin 49'. The yoke 50 in turn is adapted to be connected with a trailer coupling 51 (Fig. 20), to which reference will be made later, by a pivotal and swivel connection.

Each wing 12 has a wheel chamber or cavity 27 (Fig. 12) located at the inner end of the leading edge of the wing, which cavity is enclosed by a hinged cover 28 when the wing is attached to the automobile in flying position. A wheel 26 is mounted in the forked end of a wheel arm 29 in each cavity 27. The wheel arm 29 is in the form of a bell crank and is pivotally mounted on a support bracket 30. The opposite end of the wheel arm 29 is pivotally connected to an adjustment rod 31, the other end of which is threaded and which extends into a threaded sleeve 32. The sleeve 32 is slidably and rotatably carried in a support 35. A spring 36 is carried on the sleeve 32 between the support 35 and a fixed collar 36'. The channel wall in the outer end of the sleeve 32 is deformed in order to be rotatably engaged by the correspondingly surfaced end of a hand crank 37 or other suitable means. Thus when the wings 12 are to be demounted from the automobile by being swung rearwardly from the automobile, the wheels 26 in the wheel chambers 27 of the wings can be moved into outward position (illustrated by the broken lines in Fig. 12) by turning the sleeve 32 with the hand crank 37. These wing wheels are an important feature of my invention inasmuch as they constitute a pair of supporting and spring mounted wheels for the wings and tail portion when the wings and tail portion of the assembly are subsequently separated from the automobile. These wheels can also act as jacks for bringing the trailer (comprising the wings and tail portion) to the proper level or height when the tail portion is to be attached to the automobile in arranging the assembly for air travel as will later be apparent.

When the wings are demounted from the automobile and are swung back adjacent opposite sides of the tail portion, the bottom ends of the wing struts having been disconnected from their blocks 24 on the automobile, and when the wings are attached to each other and to the tail portion (as illustrated in Fig. 18), and when the wing wheels 26 are in engagement with the ground, the entire wing and tail portion of the assembly is then ready to be disconnected from the automobile portion. To facilitate the disconnecting of the wing and tail portion and in order to furnish a temporary support for the rear end of this wing and tail portion, I provide an adjustable wheel 52 and screw jack in the outer end of one of the wings, as shown in Fig. 14. This small supporting wheel 52 is mounted in a wheel fork 53 secured on the bottom end of the shaft 54. The shaft 54 is preferably square in cross section and is mounted for sliding in a guide bearing 56. A cavity 55 in the edge and end of the wing houses the wheel 52 and its fork 53 when this temporary supporting wheel is not being used. A threaded shaft 58 is rigidly secured to the top of the shaft 54 or formed integral with the shaft 54, and the threaded shaft 58 is supported in a drive nut 59 secured at the bottom of a drive tube 57, which in turn is mounted for rotation in a suitable bearing (not shown). The top end (not shown) of this drive tube 57, which is accessible when the wing is in demounted position, has suitable drive gear (not shown) with which crank means (not shown) is connected to facilitate the manual turning of the drive tube 57. By turning the tube 57 and therewith the nut 59 the wheel 52 can be lowered or raised. Thus when the wings are demounted and are secured to the rear end of the tail portion, as previously described, this wheel 52 is lowered and provides a temporary ground support for the tail and wings. The tail portion is now unlocked from the automobile, whereupon the automobile moves away from the tail and wings as illustrated in Fig. 8, leaving the tail and wings by themselves as a separate trailer vehicle. This separate trailer vehicle can either be left parked at the location where it is disconnected from the automobile or this may be towed by the automobile in the same manner as any trailer, its dimensions being such as to conform to existing highway codes and regulations.

If it is desired now to tow the wing and tail trailer, the automobile 10 moves around to the opposite end of the wing and tail trailer and thus from the position of Fig. 8 to the position of Fig. 9. A trailer coupling 51 (shown also in part in Fig. 20) is attached to the rear of the automobile on a suitable center support which is provided and at the same time points at which the tail portion had been attached, and is secured by similar locking means, and the outer end of this coupling 51 is connected to the yoke 50 (Fig. 20) as previously mentioned. The temporary supporting wheel 52, which will now no longer be required for supporting the coupled end of the wing and tail trailer, is raised into its cavity in the wing, and the wing and tail trailer can now be towed along by the automobile until the assembly is again to be used for air travel. The coupling 51 and its connection with the yoke 50 provides a tow attachment at a relatively high point from the ground, which facilitates the towing of the trailer in high winds since the center of gravity and the greater portion of the wing area which will be engaged by the winds are lower than the tow attachment, thus reducing to a minimum the possibility of the trailer being blown over while being towed.

The forming of the assembly into an aeroplane is accomplished easily in the exact reverse of the procedure described for demounting the wings and tail, and the manner in which the aeroplane is again set up does not require further explanation.

Thus, with my improved flying automotive vehicle assembly the change-over from air travel to land travel and vice versa is accomplished easily and expeditiously, and, when the assembly is used for land travel, the automobile portion, which comprises a vehicle actually suited for extensive highway travel, can be used either by itself, or can tow the remaining portion of the entire assembly, comprising the demounted parts and members needed for air travel only, as a separate trailer vehicle, until such time as air travel is to be resumed.

I claim:

1. In a convertible flying assembly, an automobile having a body, an aircraft tail section demountably secured on the rear of said body, stabilizers, elevators and rudder mounted on said tail section near the rear, a propeller mounted on the rear end of said tail section, a pair of wings, a flexible joint assembly connecting each wing to said tail section, cooperating wing-locking means on said automobile and on each wing for demountably securing each wing to said automobile near the leading edge of the wing, a strut for each wing extending upwardly and outwardly from said automobile to the underside of the wing when the wing is in flying position, a flexible joint connecting each strut to the corresponding wing, a detachable pivotal joint connecting the other end of the strut to said automobile, whereby, when said wing-locking means is unlocked, each of said wings may be swung rearwardly on said first mentioned flexible joint assembly while partly supported on said strut until brought into substantially vertical position adjacent the corresponding side of said tail section, and means for securing the outer ends of said wings to the rear end of said tail section when said wings are in rearwardly swung vertical position adjacent said tail section.

2. In a convertible flying assembly, an automobile having a body, a pair of front wheels and a pair of rear wheels on said automobile, an aircraft tail section demountably secured on the rear of said body and extending obliquely upwardly with respect to the plane of the axes of said wheels when said tail section is in secured position, stabilizers, elevators and rudder mounted on said tail section near the rear, a propeller mounted on the rear end of said tail section, a pair of wings, a joint assembly permanently connecting each wing to said tail section, cooperating wing-locking means on said automobile and on each wing for demountably securing each wing to said automobile near the leading edge of the wing, a strut for each wing extending upwardly and outwardly from said automobile to the underside of the wing when the wing is in flying position, a joint connecting each strut to the corresponding wing, a joint connecting the other end of the strut to said automobile, the length and weight of said tail section and the position and weight of said wings, with respect to the weight and center of gravity of said automobile being such that the center of gravity of said flying assembly, when arranged for flying will be only slightly ahead of said rear wheels of said automobile, whereby said rear wheels of said automobile will serve as landing gear when said assembly is used for air travel.

3. In a convertible flying assembly, an automobile having a body, an aircraft tail section demountably secured on the rear of said body, stabilizers, elevators and rudder mounted on said tail section near the rear, a propeller mounted on the rear end of said tail section, a pair of wings, a flexible joint assembly permanently connecting each wing to said tail section, cooperating wing-locking means on said automobile and on each wing for demountably securing each wing to said automobile near the leading edge of the wing, a strut for each wing extending upwardly and outwardly from said automobile to the underside of the wing when the wing is in flying position, a flexible joint connecting each strut to the corresponding wing, a detachable pivotal joint connecting the other end of the strut to said automobile, whereby, when said wing-locking means is unlocked, each of said wings may be swung rearwardly on said first mentioned universal joint assembly while partly supported on said strut until brought into substantially vertical position adjacent the corresponding side of said tail section, means for securing the outer ends of said wings to the rear end of said tail section when said wings are in rearwardly swung vertical position adjacent said tail section, and adjustable ground-engaging means mounted in the outer end of one of said wings for temporarily supporting said outer end of said latter mentioned wing, and therewith the adjacent end of said tail section and the end of the other wing when said wings are in rearwardly swung vertical position with their outer ends secured to said tail section and said tail section and wings are disconnected from said automobile.

4. In a convertible flying assembly, an automobile having a body, an aircraft tail section demountably secured on the rear of said body, a pair of wings, a flexible joint assembly connecting each wing to said tail section, cooperating wing-locking means on said automobile and on each wing for demountably securing each wing to said automobile near the leading edge of the wing, a strut for each wing extending upwardly and outwardly from said automobile to the underside of the wing when the wing is in flying position, a flexible joint connecting each strut to the corresponding wing, a joint connecting the other end of the strut to said automobile, whereby, when said wing-locking means is unlocked, each of said wings may be swung rearwardly on said first mentioned universal joint assembly while partly supported on said strut until brought into substantially vertical position adjacent the corresponding side of said tail section, and a wheel mounted in the leading edge of each wing, whereby said wing wheels will act as partial supports for said wings and tail section when said wings and tail section are disconnected from said automobile.

5. In a convertible flying assembly, an automobile having a body, an aircraft tail section demountably secured on the rear of said body, a pair of wings, a flexible joint assembly connecting each wing to said tail section, cooperating wing-locking means on said automobile and on each wing for demountably securing each wing to said automobile near the leading edge of the wing, a strut for each wing extending upwardly and outwardly from said automobile to the underside of the wing when the wing is in flying position, a flexible joint connecting each strut to the corresponding wing, a detachable pivotal joint connecting the other end of the strut to said automobile, whereby, when said wing-locking means is unlocked, each of said wings may be swung rearwardly on said first mentioned universal joint assembly while partly supported on said strut until brought into substantially vertical position adjacent the corresponding side of said tail section, and a wheel adjustably mounted in the inner end of the leading edge of each wing, means in each wing for lowering said wheel to ground-engaging position when said wing is in rearwardly swung vertical position, whereby said wing wheels will act as partial supports for said wings and tail section when said wings and tail section are disconnected from said automobile.

6. In a convertible flying assembly, an automobile having a body, an aircraft tail section demountably secured on the rear of said body, a pair of wings, a flexible joint assembly permanently connecting each wing to said tail section, cooperating wing-locking means on said automobile and on each wing for demountably securing each wing to said automobile near the leading edge of the wing, a strut for each wing extending upwardly and outwardly from said automobile to the underside of the wing when the wing is in flying position, a flexible joint assembly connecting each strut to the corresponding wing, a detachable pivotal joint connecting the other end of the strut to said automobile, whereby, when said wing-locking means is unlocked, each of said wings may be swung rearwardly on said first mentioned flexible joint assembly while partly supported on said strut until brought into substantially vertical position adjacent the corresponding side of said tail section, means for securing the outer ends of said wings to the rear end of said tail section when said wings are in rearwardly swung vertical position adjacent said tail section, a wheel adjustably mounted in the inner end of the leading edge of each wing, and means in each wing for lowering said wheel to ground-engaging position when said wing is in rearwardly swung vertical position, whereby said wing wheels will support the corresponding ends of said wings and therewith said tail section when said tail section and wings are disconnected from said automobile, the adjustable mounting for each of said wing wheels including a cushioning spring element.

7. The combination set forth in claim 1 with the addition of a wheel adjustably mounted in the inner end of the leading edge of each wing, means in each wing for lowering said wheel to ground-engaging position when said wing is in rearwardly swung vertical position, whereby said wing wheels will support the corresponding ends of said wings and therewith said tail section when said tail section and wings are disconnected from said automobile, and adjustable ground-engaging means mounted in the outer end of one of said wings for temporarily supporting said outer end of said latter mentioned wing and therewith the adjacent end of said tail section and the outer end of the other wing when said wings are in rearwardly swung vertical position with their outer ends secured to said tail section and said tail section and wings are disconnected from said automobile.

8. In a convertible flying assembly of the character described, an automobile having a body, an aircraft tail section demountably secured on the rear of said body, stabilizers, elevators and rudder mounted on said tail section near the rear, a propeller mounted on the rear end of said tail section beyond said rudder, a pair of wings, a joint assembly permanently connecting each wing to said tail section, cooperating wing-locking means on said automobile and on each wing for demountably securing each wing to said automobile near the leading edge of the wing, a strut for each wing extending upwardly and outwardly from said automobile to the underside of the wing when the wing is in flying position, a flexible joint connecting each strut to the corresponding wing, a detachable joint connecting the other end of the strut to said automobile, whereby, when said wing-locking means is unlocked, each of said wings may be swung rearwardly on said first mentioned joint assembly while partly supported on said strut until brought into substantially vertical position adjacent the corresponding side of said tail section, means for securing the outer ends of said wings to the rear end of said tail section when said wings are in rearwardly swung vertical position adjacent said tail section, a wheel adjustably mounted in the inner end of the leading edge of each wing, means in each wing for lowering said wheel to ground-engaging position when said wing is in rearwardly swung vertical position, whereby said wing wheels will support the corresponding ends of said wings and therewith said tail section when said tail section and wings are disconnected from said automobile, adjustable ground-engaging means mounted in the outer end of one of said wings for temporarily supporting said outer end of said latter mentioned wing, and therewith the adjacent end of said tail section and the outer end of the other wing when said wings are in rearwardly swung vertical position with their outer ends secured to said tail section, a trailer support coupling attachable to the rear end of said automobile when said tail section is disconnected from said automobile, and cooperating coupling means on the outer ends of said wings enabling said latter ends of said wings and said tail section to be coupled as a trailer vehicle to said automobile and caused to travel on said wing wheels.

9. A convertible flying assembly of the character described including an automobile having a body, an aircraft tail section demountably secured on the rear of said body, a pair of front wheels and a pair of rear wheels on said automobile, the bottom line of said tail section extending rearwardly and obliquely upwardly with respect to said body when said tail section is in secured position, stabilizers, elevators and rudder mounted on said tail section near the rear, a propeller mounted on the rear end of said tail section beyond said rudder, a pair of wings, a pivotal-universal joint assembly permanently connecting each wing to said tail section, cooperating wing-locking means on said automobile and on each wing for demountably securing each wing to said automobile near the leading edge of the wing, a strut for each wing extending upwardly and outwardly from said automobile to the underside of the wing when the wing is in flying position, a substantially universal joint connecting each strut to the corresponding wing, a detachable pivotal and swivel joint connecting the other end of the strut to said automobile, a wheel adjustably mounted in the inner end of the leading edge of each wing, the length and weight of said tail section and the position and weight of said wings with respect to the weight and center of gravity of said automobile being such that the center of gravity of said assembly when arranged for flying will be only slightly ahead of said rear wheels of said automobile, whereby said rear wheels of said automobile will serve as landing gear when said assembly is used for air travel, the mounting of said wings being such that, when said wing-locking means is unlocked, each of said wings may be swung rearwardly on said first mentioned joint assembly while partly supported on said strut until brought into substantially vertical position adjacent the corresponding side of said tail section, and means in said wings for lowering said wing wheels to ground-engaging position when said wings are in rearwardly swung vertical position.

References Cited in the file of this patent

UNITED STATES PATENTS

| | | |
|---|---|---|
| 1,603,697 | Klemm | Oct. 19, 1926 |
| 1,855,574 | Hubert | Apr. 26, 1932 |
| 2,011,254 | Nightingale | Aug. 13, 1935 |
| 2,434,068 | Geisse | Jan. 6, 1948 |
| 2,532,755 | Bloomfield | Dec. 5, 1950 |
| 2,533,925 | Fulton, Jr. | Dec. 12, 1950 |
| 2,624,530 | Hanssen | Jan. 6, 1953 |

FOREIGN PATENTS

| | | |
|---|---|---|
| 486,758 | Great Britain | June 9, 1938 |
| 559,819 | Great Britain | Mar. 7, 1944 |